United States Patent [19]

Kodama et al.

[11] Patent Number: 4,615,307

[45] Date of Patent: Oct. 7, 1986

[54] HYDRAULIC VALVE LIFTER FOR VARIABLE DISPLACEMENT ENGINE

[75] Inventors: Hisashi Kodama, Nagoya; Yukimori Kobayashi, Gamagori, both of Japan

[73] Assignee: Aisin Seiki Kabushiki Kaisha, Kariya, Japan

[21] Appl. No.: 717,920

[22] Filed: Mar. 29, 1985

[30] Foreign Application Priority Data

Mar. 29, 1984 [JP] Japan .................................. 59-063022

[51] Int. Cl.⁴ .............................................. F02D 13/06
[52] U.S. Cl. ................. 123/90.16; 123/90.27; 123/90.44; 123/198 F
[58] Field of Search ............... 123/90.27, 90.16, 90.15, 123/198 F, 90.44

[56] References Cited

U.S. PATENT DOCUMENTS

| | | | |
|---|---|---|---|
| 4,442,806 | 4/1984 | Matsuura et al. | 123/90.27 |
| 4,469,061 | 9/1984 | Ajiki et al. | 123/90.27 |
| 4,475,497 | 10/1984 | Honda et al. | 123/90.16 |
| 4,480,617 | 11/1984 | Nakano et al. | 123/90.16 |
| 4,481,919 | 11/1984 | Honda et al. | 123/90.16 |
| 4,509,467 | 4/1985 | Arai et al. | 123/90.16 |
| 4,515,121 | 5/1985 | Matsuura et al. | 123/90.27 |

*Primary Examiner*—Ira S. Lazarus
*Attorney, Agent, or Firm*—Sughrue, Mion, Zinn, Macpeak, and Seas

[57] ABSTRACT

A hydraulic valve lifter for a variable displacement engine includes a body member, a check valve disposed within the body member for controlling a pressure chamber and a reservoir chamber, a sleeve member secured to one end of the body member, a plunger member slidably disposed in an axial bore of the sleeve member, and a solenoid valve having a valve rod for actuating the check valve. The direction of movement of the check valve is disposed at right angles to the axial direction of the body member. The direction of movement of the valve rod is the same as the direction of the movement of the check valve.

4 Claims, 1 Drawing Figure

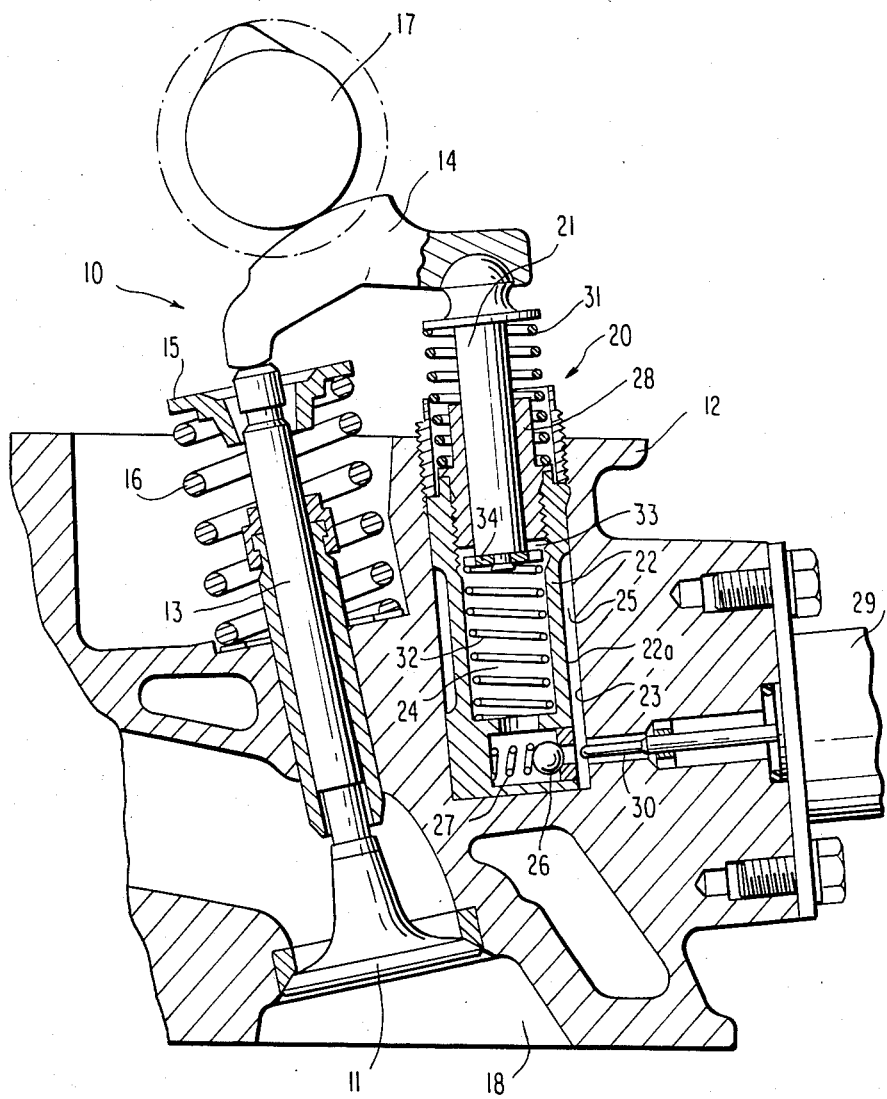

HYDRAULIC VALVE LIFTER FOR VARIABLE DISPLACEMENT ENGINE

BACKGROUND OF THE INVENTION

The present invention relates generally to a hydraulic valve lifter for a variable displacement engine of an automobile.

When an automobile having a multi-cylinder engine is running under low load conditions at relatively constant speed, descending a long hill, decelerating or idling, it is unnecessary to operate all of the cylinders of the engine. In order to save fuel consumption and to improve gas mileage, there have been proposed various types of hydraulic valve lifters to effectively perform a variable displacement of the multicylinder engine.

One such prior art lifter includes a body member, a plunger member slidably disposed within the body member and operatively connected to one end of a rocker arm; a pressure chamber defined by the body member and the plunger member, and a reservoir chamber formed in the plunger member and connected to the pressure chamber through a check valve. When the corresponding engine cylinders are not in use due to one of the above conditions of automobile operation, the check valve will be maintained at the open position by a solenoid valve thereby allowing a fluid flow from the pressure chamber to the reservoir chamber. Accordingly, the fluid in the pressure chamber will not generate a pressure increase and the rigidity of the lifter will be removed.

Such prior art, however, discloses also that the diameters of the plunger member and the body member bore are substantially the same, i.e., the outer diameter of the plunger member being substantially equal to the inner diameters of the body member. According to such a structure, since the amount of hydraulic fluid flow is considerably large, the slidable movement of the plunger member may not be effectively carried out. On the other hand, if the inner diameter of the body member is lessened in order to avoid the problems, the size of the check valve therein should be reduced accordingly, which will not meet the required functions of the check valve.

SUMMARY OF THE INVENTION

It is, therefore, an object of the present invention to provide a new and improved hydraulic valve lifter which eliminates the disadvantages of the prior art hydraulic valve lifters.

More specifically, it is an object of the present invention to provide a hydraulic valve lifter wherein the inner diameter of the body member is larger than the outer diameter of the plunger member so as to reduce the amount of fluid flow from the pressure chamber to the reservoir chamber.

In one illustrative embodiment of the present invention, there is provided a hydraulic valve lifter which includes a body member, a pressure chamber and a reservoir chamber in the body member, a check valve disposed within the body member for controlling fluid communication between the pressure and reservoir chambers, a sleeve member secured to an open end of the body member and having an axial bore therein, a plunger member slidably disposed in the axial bore of the sleeve member, and a solenoid valve having a valve rod for actuating the check valve, wherein the moving direction of the solenoid valve is set to meet at right angles with the axial direction of the body member, and wherein the moving direction of the valve rod is set to be the same with the moving direction of the check valve.

In the above-mentioned prior art hydraulic valve lifter, the check valve is mounted within the body member so that the check valve may move in the axial direction of the body member. A shock or impact which the body member receives from the rocker arm is generated in the axial direction of the body member. Accordingly, the support of the check valve becomes unstable due to the influence of the above shock thereby deteriorating the sealing function of the check valve. In particular during a high speed rotation of the engine, the check valve will be apt to make an error in operation thereby generating an abnormal operation in the engine valve train. In accordance with the present invention, however, the check valve is disposed within the body member so that the moving direction of the check valve may meet at right angles with the axial direction of the body member, thereby preventing the shock or impact from acting upon the check valve from the rocker arm, with the result that the errors in operation of the check valve can be avoided and the abnormal operations of the engine valve train can be avoided.

Other objects, features and advantages of the invention will become more apparent upon reference to the succeeding detailed description thereof, and to the drawing illustrating a preferred embodiment thereof.

BRIEF DESCRIPTION OF THE DRAWING

The sole FIGURE shows a cross-sectional view of an engine valve train incorporating a hydraulic valve lifter embodying the present invention.

DETAILED DESCRIPTION OF THE INVENTION

Referring now to the drawing, an engine valve train 10 includes an intake and exhaust valve 11 mounted in a cylinder head 12, and a valve stem 13 connected to the valve 11. The valve stem 13 is in contact with one end of the rocker arm 14. the other end of the rocker arm 14 is operatively connected to a hydraulic valve lifter 20 as provided according to the present invention. The valve train 10 further includes a valve retainer 15 for retaining a valve spring 16 which normally biases the valve 11 in its closing direction. When a cam shaft 17 is rotated, the rocker arm 14 will be swung about the contact point with a plunger member 21 of the hydraulic valve lifter 20 which acts as a fulcrum point. In response to the rotational movement of the rocker arm 14, the intake and exhaust valve 11 is operated to open or close a combustion chamber 18 of the engine.

The hydraulic valve lifter 20 includes a body member 22 mounted in a bore 23 in the cylinder head 12, a pressure chamber 24 formed in the body member 22, a reservoir chamber 25 defined between the outer circumferential surface 22a of the body member 22 and the bore 23, a ball check valve 26 disposed within the body member 22 for controlling fluid communication between the pressure chamber 24 and the reservoir chamber 25 and normally biased in its closing direction by a spring 27, a sleeve member 28 securely threaded into an open end of the body member 22, a plunger member 21 slidably disposed in an axial bore of the sleeve member 28, and a solenoid valve having a valve rod 30 for actuating the check valve 26. The ball check valve 26 is disposed within the body member 22 so that the moving direction of the check valve 26 is disposed at right angles to the axial direction of the body member 22. The valve rod 30 is disposed within the cylinder head 12 so that the moving direction of the valve rod 30 is the same as the moving direction of the check valve 26.

When an automobile is running at a constant speed or under a condition that will not need all the engine cylinders to be operated, the hydraulic valve lifter 20 is actuated to interrupt the open/close operation of the valve 11. When such a condition is sensed, the solenoid valve 29 is actuated to move the valve rod 30 to the left as viewed in the drawing, namely in a direction perpendicular to the axial direction of the body member 22. Accordingly, since the check valve 26 is pushed against the biasing force of the spring 27 by means of the valve rod 30, fluid communication is established between the pressure chamber 24 and the reservoir chamber 25 thereby preventing a pressure increase in the pressure chamber 24. It should be noted that the biasing force of the valve spring 16 is selected to be larger than the total amount of the biasing forces of springs 31, 32 of the valve lifter 20. Under the above condition, when the cam shaft 17 is rotated, the rocker arm 14 is swung about the contact point with the valve stem 13. The rotational movement of the rocker arm 14 moves the plunger member 21 of the valve lifter 20 down within the lifter 20, thereby giving no movement to the valve 11.

The upper end of the plunger member 21 engages with the end of the rocker arm 14. The outer diameter of the plunger member 21 may be designed to be smaller than the inner diameter of the body member 22. In other words, the inner diameter of the body member 22 can be chosen to be any desired size independently of the size of the plunger member 21. Since the outer diameter of the plunger member 21 could be reduced, one of the compression spring 31, 32 could be provided at the outer periphery of the plunger member 21 so that a load applied on the other spring (in this embodiment, 32) could be reduced thereby to enable the fine adjustment of biasing forces of springs.

Numeral 33 designates an inlet for the working fluid into the pressure chamber 24. Numeral 34 designates a perforated plate retainer secured to the plunger member 21 which serves as a spring retainer for the spring 32.

It will be apparent to those skilled in the art that the valve lifter of the present invention may be constructed in a variety of ways without, however, departing from the scope and spirit of the appended claims.

What is claimed is:

1. A hydraulic valve lifter for a variable displacement engine, said lifter comprising:
   a body member mounted in a bore in a cylinder head;
   a pressure formed in said body member;
   a reservoir chamber defined by an outer circumferential surface of said body member and said bore;
   a check valve disposed within said body member for controlling fluid communication between said pressure chamber and said reservoir chamber, said check valve being moveable at right angles relative to the axial direction of said body member;
   a sleeve member secured to an open end of said body member and having an axial bore therein;
   a plunger member slidably disposed in said axial bore of said sleeve member, one end of said plunger member being disposed in said pressure chamber and the other end thereof adapted to be in cooperative contact with a valve rocker arm; and
   a solenoid valve having a valve rod for actuating said check valve, said valve rod being moveable in the same direction as said check valve.

2. A hydraulic valve lifter according to claim 1 further comprising a pair of compression springs operatively associated with said body member, said pair of springs biasing said plunger member in one direction.

3. A hydraulic valve lifter according to claim 2, wherein one of said pair of springs is disposed at an outer periphery of said sleeve member and the other of said pair of springs is disposed within said body member.

4. A hydraulic valve lifter according to claim 1, wherein said body member is provided in a bore of an engine cylinder head and wherein said one end of said plunger member is in engagement with one end of said rocker arm while the other end of said rocker arm is in contact with an intake and exhaust valve.

* * * * *